United States Patent
Sawada et al.

(10) Patent No.: US 9,633,784 B2
(45) Date of Patent: Apr. 25, 2017

(54) ELECTRONIC COMPONENT

(71) Applicant: Murata Manufacturing Co., Ltd., Nagaokakyo-shi, Kyoto-fu (JP)

(72) Inventors: Takashi Sawada, Nagaokakyo (JP); Shigekatsu Yamamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 240 days.

(21) Appl. No.: 14/501,105

(22) Filed: Sep. 30, 2014

(65) Prior Publication Data

US 2015/0116897 A1 Apr. 30, 2015

(30) Foreign Application Priority Data

Oct. 25, 2013 (JP) .................................. 2013-221849
Jul. 23, 2014 (JP) .................................. 2014-149320

(51) Int. Cl.
| | |
|---|---|
| *H01G 4/228* | (2006.01) |
| *H01G 4/30* | (2006.01) |
| *H01G 2/06* | (2006.01) |
| *H01G 4/12* | (2006.01) |
| *H01G 4/232* | (2006.01) |
| *H01G 4/008* | (2006.01) |

(52) U.S. Cl.
CPC .............. *H01G 2/065* (2013.01); *H01G 4/12* (2013.01); *H01G 4/232* (2013.01); *H01G 4/30* (2013.01); *H01G 4/0085* (2013.01)

(58) Field of Classification Search
CPC ........... H01G 4/232; H01G 4/228; H01G 4/30
USPC ...................... 361/306.1, 306.3, 308.1, 301.4
See application file for complete search history.

(56) References Cited

U.S. PATENT DOCUMENTS

| | | | |
|---|---|---|---|
| 5,198,968 A † | 3/1993 | Galvagni | |
| 5,394,295 A † | 2/1995 | Galvagni | |
| 6,525,628 B1 † | 2/2003 | Ritter | |
| 2003/0011962 A1* | 1/2003 | Yamamoto | H01G 4/30 361/321.2 |
| 2007/0119911 A1 † | 5/2007 | Chan et al. | |
| 2011/0205684 A1* | 8/2011 | Yamamoto | H01G 4/232 361/305 |
| 2012/0188684 A1* | 7/2012 | Akazawa | H01G 4/012 361/321.2 |

(Continued)

FOREIGN PATENT DOCUMENTS

JP 2009-218363 A 9/2009

*Primary Examiner* — Eric Thomas
(74) *Attorney, Agent, or Firm* — Keating & Bennett, LLP

(57) ABSTRACT

In an electronic component, a first terminal electrode is disposed on a first side surface and extends to a second principal surface. A second terminal electrode is disposed on a second side surface and extends to the second principal surface. A third terminal electrode is disposed on a third side surface and extends to the second principal surface. A fourth terminal electrode is disposed on a fourth side surface and extends to the second principal surface. Maximum values of thicknesses of portions located on the second principal surface of the third and fourth terminal electrodes are smaller than maximum values of thicknesses of portions located on the second principal surface of the first and second terminal electrodes.

20 Claims, 2 Drawing Sheets

(56) References Cited

U.S. PATENT DOCUMENTS

| | | | |
|---|---|---|---|
| 2013/0033154 A1* | 2/2013 | Sakuratani | H01G 4/30 310/366 |
| 2014/0085767 A1* | 3/2014 | Kang | H01G 4/12 361/301.4 |
| 2014/0311786 A1* | 10/2014 | Park | H01G 4/385 174/260 |
| 2015/0014035 A1* | 1/2015 | Park | H01G 2/065 174/260 |

\* cited by examiner
† cited by third party

ELECTRONIC COMPONENT

BACKGROUND OF THE INVENTION

1. Field of the Invention

The present invention relates to an electronic component.

2. Description of the Related Art

An example of a multilayer capacitor according to the related art is a multilayer capacitor in which a signal terminal electrode is disposed on each of first and second end surfaces of a main body of the capacitor, and a ground terminal electrode is disposed on each of first and second side surfaces of the main body (see, for example, Japanese Unexamined Patent Application Publication No. 2009-218363).

In the case of mounting the multilayer capacitor on a substrate, if the amount of solder applied between each terminal electrode and a land varies, the multilayer capacitor may be mounted in an inclined state.

SUMMARY OF THE INVENTION

Accordingly, preferred embodiments of the present invention provide an electronic component that is less likely to be inclined when being mounted on a substrate.

According to a preferred embodiment of the present invention, an electronic component includes a main body, a first terminal electrode, a second terminal electrode, a third terminal electrode, and a fourth terminal electrode. The main body includes a first principal surface, a second principal surface, a first side surface, a second side surface, a third side surface, and a fourth side surface. The first and second principal surfaces each extend along a first direction and a second direction. The second direction is perpendicular or substantially perpendicular to the first direction. The first and second side surfaces each extend along the first direction and a third direction. The third direction is perpendicular or substantially perpendicular to the first and second directions. The third and fourth side surfaces each extend along the second direction and the third direction. The first terminal electrode is disposed on the first side surface and extends to the second principal surface. The second terminal electrode is disposed on the second side surface and extends to the second principal surface. The third terminal electrode is disposed on the third side surface and extends to the second principal surface. The fourth terminal electrode is disposed on the fourth side surface and extends to the second principal surface. Maximum values of thicknesses of portions located on the second principal surface of the third and fourth terminal electrodes are smaller than maximum values of thicknesses of portions located on the second principal surface of the first and second terminal electrodes.

Lengths along the second direction of the third and fourth side surfaces preferably are larger than lengths along the first direction of the first and second side surfaces.

The first and second terminal electrodes preferably extend, on the second principal surface, from one end portion to another end portion in the first direction of the second principal surface.

Lengths along the second direction of the first and second terminal electrodes on the second principal surface preferably are larger than lengths along the first direction of the third and fourth terminal electrodes on the second principal surface.

End portions in the first direction of the second principal surface preferably are located closer to the first principal surface than another portion in the first direction of the second principal surface is. At least some of portions located on the second principal surface of the third and fourth terminal electrodes preferably are located on the end portions in the first direction of the second principal surface.

The third and fourth terminal electrodes each preferably extend to the another portion in the first direction of the second principal surface.

According to a preferred embodiment of the present invention, there is provided an electronic component that is less likely to be inclined when being mounted on a substrate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
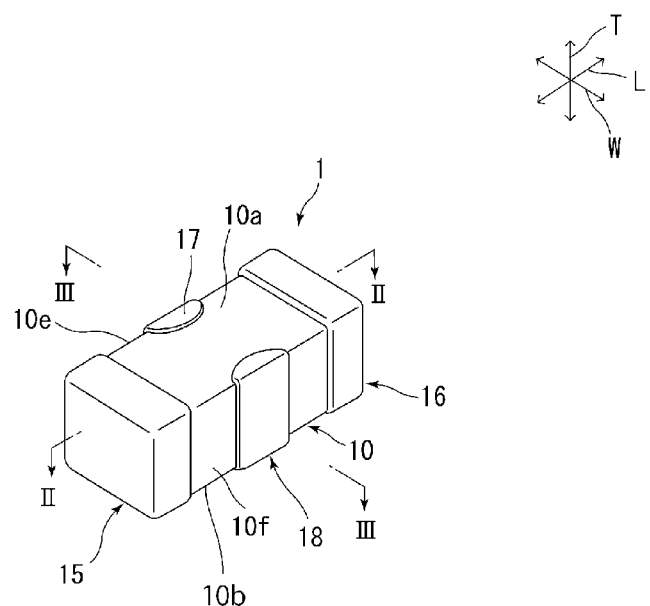
FIG. 1 is a schematic perspective view of a ceramic capacitor according to a preferred embodiment of the present invention.

Hereinafter, preferred embodiments of the present invention will be described. Note that the following preferred embodiments are merely examples, and the present invention is not limited to the preferred embodiments described herein.

In individual figures that are referred to in the description of the preferred embodiments, elements having the same or substantially the same function are denoted by the same reference numerals. The figures that are referred to in the description of the preferred embodiments are schematically illustrated. The ratio of dimensions of objects illustrated in the figures may be different from the ratio of dimensions of actual objects. Also, the ratio of dimensions of objects may be different among figures. A specific ratio of dimensions of objects should be determined in consideration of the description given below.

An electronic component according to various preferred embodiments of the present invention may be a ceramic capacitor, a piezoelectric component, a thermistor, an inductor, or the like. Hereinafter, a description will be given of an example in which the electronic component according to various preferred embodiments is a ceramic capacitor.

Figure 2:
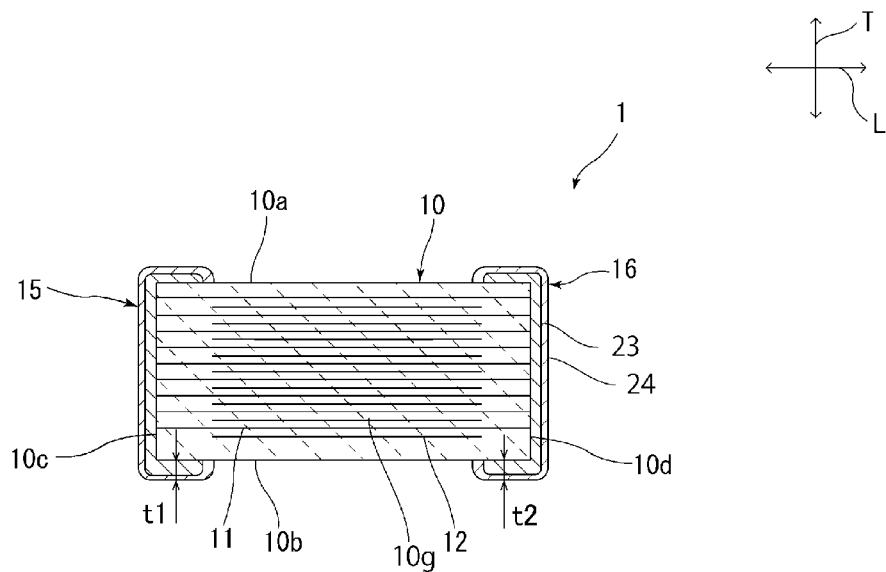
FIG. 2 is a schematic cross-sectional view taken along line II-II in FIG. 1.
Figure 3:
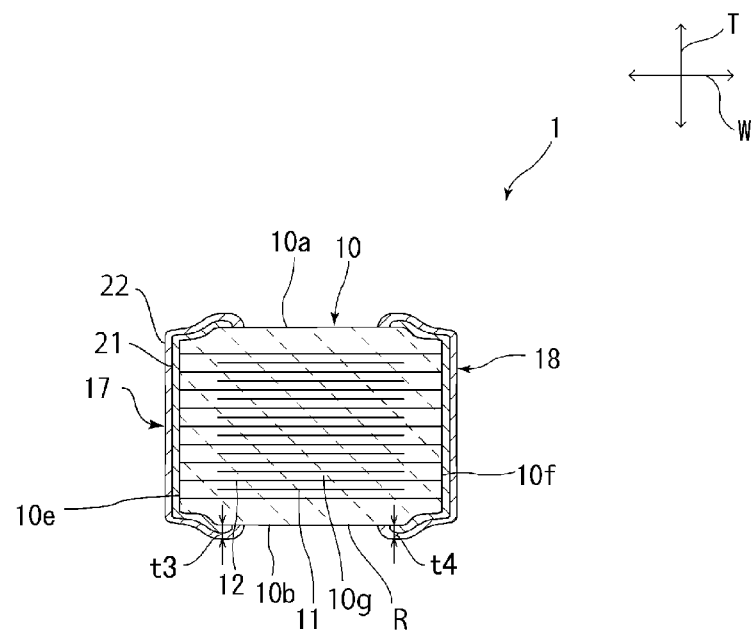
FIG. 3 is a schematic cross-sectional view taken along line III-III in FIG. 1.

FIG. 1 is a schematic perspective view of a ceramic capacitor 1 according to a preferred embodiment of the present invention. FIG. 2 is a schematic cross-sectional view taken along line II-II in FIG. 1. FIG. 3 is a schematic cross-sectional view taken along line III-III in FIG. 1.

As illustrated in FIGS. 1 to 3, the ceramic capacitor includes a main body 10. The main body 10 preferably is rectangular or substantially rectangular parallelepiped shaped. Corner portions and edge portions of the main body 10 may be chamfered or rounded. Principal surfaces and side surfaces of the main body 10 may include irregularities.

The main body 10 includes first and second principal surfaces 10a and 10b, first and second side surfaces 10c and 10d, and third and fourth side surfaces 10e and 10f.

The first and second principal surfaces 10a and 10b each extend along a width direction W (first direction) and a length direction L (second direction). The length direction L is perpendicular or substantially perpendicular to the width direction W. The first and second principal surfaces 10a and 10b face each other in a thickness direction T (third direction). The thickness direction T is perpendicular or substantially perpendicular to the length direction L and the width direction W.

In this preferred embodiment, a description will be given of an example in which the first direction is the width direction W and the second direction is the length direction L. However, the present invention is not limited to this configuration. For example, the first direction may be the length direction L and the second direction may be the width direction W. That is, the longitudinal direction of the main body 10 may extend along either of the first direction and the second direction.

The first and second side surfaces 10c and 10d each extend along the width direction W (first direction) and the thickness direction T (third direction). The first and second side surfaces 10c and 10d face each other in the length direction L.

The third and fourth side surfaces 10e and 10f each extend along the length direction L (second direction) and the thickness direction T (third direction). The third and fourth side surfaces 10e and 10f face each other in the width direction W.

The main body 10 may be constituted by, for example, a ceramic body composed of a dielectric ceramic. Hereinafter, a description will be given in this preferred embodiment of an example in which the main body 10 is composed of a dielectric ceramic.

Non-limiting examples of a dielectric ceramic include $BaTiO_3$, $CaTiO_3$, $SrTiO_3$, and $CaZrO_3$. A Mn compound, a Mg compound, a Si compound, a Fe compound, a Cr compound, a Co compound, a Ni compound, a rare earth compound, or the like may be added to the ceramic body, for example.

As illustrated in FIGS. 2 and 3, first inner electrodes 11 and second inner electrodes 12 are disposed in the main body 10. The first and second inner electrodes 11 and 12 may be made of a metal, such as Ni, Cu, Ag, Pd, Au, or a Ag—Pd alloy, for example.

The first inner electrodes 11 face the second inner electrodes 12 via a ceramic portion 10g in the thickness direction T. Specifically, the first inner electrodes 11 extend to the first side surface 10c and the second side surface 10d. The first inner electrodes 11 are electrically connected to a first signal terminal electrode 15 disposed on the first side surface 10c and a second signal terminal electrode 16 disposed on the second side surface 10d.

The first signal terminal electrode 15 is disposed on the first side surface 10c and extends onto the first and second principal surfaces 10a and 10b and the third and fourth side surfaces 10e and 10f. The first signal terminal electrode 15 is preferably arranged, on the second principal surface 10b, so as to extend from one end portion to the other end portion in the width direction W of the second principal surface 10b.

The second signal terminal electrode 16 is disposed on the second side surface 10d and extends onto the first and second principal surfaces 10a and 10b and the third and fourth side surfaces 10e and 10f. The second signal terminal electrodes 16 is arranged, on the second principal surface 10b, so as to extend from one end portion to the other end portion in the width direction W of the second principal surface 10b.

The second inner electrodes 12 extend to the third side surface 10e and the fourth side surface 10f. The second inner electrodes 12 are electrically connected to a first ground terminal electrode 17 disposed on the third side surface 10e and a second ground terminal electrode 18 disposed on the fourth side surface 10f.

The first ground terminal electrode 17 is disposed on the third side surface 10e and extends onto the first and second principal surfaces 10a and 10b.

The second ground terminal electrode 18 is disposed on the fourth side surface 10f and extends onto the first and second principal surfaces 10a and 10b.

As illustrated in FIG. 3, the first and second ground terminal electrodes 17 and 18 each include a first electrode layer 21 disposed on the third side surface 10e or the fourth side surface 10f, and a second electrode layer 22 disposed on the first electrode layer 21.

The first and second electrode layers 21 and 22 each contain glass and a conductive material. In this preferred embodiment, specifically, the first and second electrode layers 21 and 22 each are preferably a fired electrode layer formed by firing a paste containing a glass powder and a conductive material. The conductive material may be made of a metal such as Ni, Cu, Ag, Pd, Au, or a Ag—Pd alloy, for example.

The first and second ground terminal electrodes 17 and 18 each may further include another electrode layer in addition to the first and second electrode layers 21 and 22. The first and second ground terminal electrodes 17 and 18 each may further include, for example, at least one plating layer disposed on the second electrode layer 22.

As illustrated in FIG. 2, the first and second signal terminal electrodes 15 and 16 each include a third electrode layer 23 disposed on the first side surface 10c or the second side surface 10d, and a fourth electrode layer 24 disposed on the third electrode layer 23.

The third and fourth electrode layers 23 and 24 each contain glass and a conductive material. In this preferred embodiment, specifically, the third and fourth electrode layers 23 and 24 each preferably are a fired electrode layer formed by firing a paste containing a glass powder and a conductive material. The conductive material may be made of a metal such as Ni, Cu, Ag, Pd, Au, or a Ag—Pd alloy, for example.

The first and second signal terminal electrodes 15 and 16 each may further include another electrode layer in addition to the third and fourth electrode layers 23 and 24. The first and second signal terminal electrodes 15 and 16 each may further include, for example, at least one plating layer disposed on the fourth electrode layer 24.

Normally, the thickness of a portion located on the second principal surface of a ground terminal electrode preferably is set to be equal or substantially equal to the thickness of a portion located on the second principal surface of a signal terminal electrode. However, in a case where the thickness of the portion located on the second principal surface of the ground terminal electrode is equal or substantially equal to the thickness of the portion located on the second principal surface of the signal terminal electrode, if the amount of solder applied between a land and the ground terminal electrode located at the center in the length direction is larger than the amount of solder applied between the land and the signal terminal electrode, a center portion in the length direction of the ceramic capacitor is raised and protrudes. Accordingly, the ceramic capacitor is likely to be inclined.

As illustrated in FIG. 3, a maximum value of the thickness of a portion located on the second principal surface 10b of the first ground terminal electrode 17 is represented by t3, and a maximum value of the thickness of a portion located on the second principal surface 10b of the second ground terminal electrode 18 is represented by t4. As illustrated in FIG. 2, a maximum value of the thickness of a portion located on the second principal surface 10b of the first signal terminal electrode 15 is represented by t1, and a maximum value of the thickness of a portion located on the second principal surface 10b of the second signal terminal electrode 16 is represented by t2. In this case, in the ceramic capacitor 1, t3 is smaller than t1 and t2, and t4 is smaller than t1 and t2. Thus, the distance from the first and second ground terminal electrodes 17 and 18 to the land is larger than the distance from the first and second signal terminal electrodes 15 and 16 to the land. Thus, even if a large amount of solder is applied between the first and second ground terminal electrodes 17 and 18 and the land, the solder is easily put into a space between the first and second ground terminal electrodes 17 and 18 and the land, and thus the solder is less likely to raise a center portion in the length direction L of the ceramic capacitor 1. Accordingly, the ceramic capacitor 1 is less likely to be inclined.

From the viewpoint of more effectively reducing or preventing inclination of the ceramic capacitor 1 at the time of mounting, t3 is preferably less than about one times t1 and t2, and is more preferably equal to or less than about 0.95 times t1 and t2, for example. Also, t4 is preferably less than about one times t1 and t2, and is more preferably equal to or less than about 0.95 times t1 and t2, for example. However, if t3 and t4 are too small, there is a probability that an electrical connection between the first and second ground terminal electrodes 17 and 18 and the land is not reliably established. Thus, t3 and t4 each are preferably equal to or more than about 0.5 times t1 and t2, and are more preferably equal to or more than about 0.65 times t1 and t2, for example.

In the present invention, it is assumed that t1 and t2 are measured on a polished surface that is exposed as a result of polishing a third side surface of the ceramic capacitor 1 to the center in the width direction W. Specifically, t1 and t2 can be obtained by performing ion milling on the polished surface, removing a polish sagging, and then measuring the thicknesses of first and second terminal electrodes on a second principal surface projected onto the polished surface.

Also, t3 and t4 can be obtained by performing ion milling on a polished surface that is exposed as a result of polishing a first side surface of the ceramic capacitor 1 to the center in the length direction L, removing a polish sagging, and then measuring the thicknesses of third and fourth terminal electrodes on the second principal surface projected onto the polished surface.

In an electronic component according to various preferred embodiments of the present invention, it can be determined that maximum values of the thicknesses of portions located on the second principal surface of the third and fourth terminal electrodes are smaller than maximum values of the thicknesses of portions located on the second principal surface of the first and second terminal electrodes, by mounting the electronic component on a substrate and by observing that the first and second terminal electrodes are in contact with the substrate whereas the third and fourth terminal electrodes are not in contact with the substrate, for example.

From the viewpoint of more effectively reducing or preventing the inclination of the ceramic capacitor 1 at the time of mounting, it is preferable that the lengths along the length direction L of the first and second signal terminal electrodes 15 and 16 on the second principal surface 10b be larger than the lengths along the width direction W of the first and second ground terminal electrodes 17 and 18 on the second principal surface 10b. This is because, in this case, the amount of solder applied to the first and second ground terminal electrodes 17 and 18 at the time of mounting is smaller.

Meanwhile, there is a demand for disposing a four-terminal ceramic capacitor, such as the ceramic capacitor 1 according to this preferred embodiment, in a mounting space for a two-terminal ceramic capacitor including only first and second outer electrodes that face each other. However, if a four-terminal ceramic capacitor according to the related art is mounted in such a mounting space, a solder applied between outer ground electrodes and a land may protrude in the width direction from the main body of the capacitor. Thus, a larger mounting space is necessary, and it may be difficult to mount the capacitor in the mounting space for a two-terminal ceramic capacitor.

In the ceramic capacitor 1 according to this preferred embodiment, a solder is easily put into a space between the first and second ground terminal electrodes 17 and 18 and the land, as described above. Thus, even if an increased amount of solder is applied between the main body 10 and the substrate, the solder is less likely to protrude in the width direction W from the main body 10. Accordingly, the mounting space is significantly decreased by using the ceramic capacitor 1. It may be possible to mount the ceramic capacitor 1 in a mounting space for a two-terminal capacitor.

Furthermore, in this preferred embodiment, as illustrated in FIG. 3, end portions of the main body 10 in the width direction W of the second principal surface 10b are located closer to the first principal surface 10a than another portion R in the width direction W of the second principal surface 10b is. At least some of portions located on the second principal surface 10b of the first and second ground terminal electrodes 17 and 18 is located on the end portions of the main body 10 in the width direction W of the second principal surface 10b. Thus, a larger space for solder is obtained between the first and second ground terminal electrodes 17 and 18 and the land. Accordingly, even if an increased amount of solder is applied between the main body 10 and the substrate, protrusion of the solder in the width direction W from the main body 10 is effectively minimized or prevented. Therefore, according to the ceramic capacitor 1, the mounting space is further decreased.

From the viewpoint of further decreasing the mounting space, the entire portions located on the second principal surface 10b of the first and second ground terminal electrodes 17 and 18 may be disposed on the end portions of the main body 10 in the width direction W of the second principal surface 10b. In this case, however, the distance from the first and second ground terminal electrodes 17 and 18 to the land is elongated over the entire area, and there is a probability that the electrical connection between the first and second ground terminal electrodes 17 and 18 and the land is not reliably established. For this reason, it is preferable that each of the first and second ground terminal electrodes 17 and 18 reach the other portion R in the width direction W of the second principal surface 10b. In this case, the distance from the portions, of the first and second ground terminal electrodes 17 and 18, located on the other portion R in the width direction W of the second principal surface 10b to the land is short. Thus, the electric connection between the portions, of the first and second ground terminal electrodes 17 and 18, located on the other portion R in the width direction W of the second principal surface 10b and the land is reliably established.

A method for manufacturing the ceramic capacitor 1 is not particularly limited. The ceramic capacitor 1 can be manufactured in the following manner, for example.

First, ceramic green sheets containing a ceramic powder are prepared. The ceramic green sheets can be made by, for example, printing a ceramic paste containing a ceramic powder or the like.

Subsequently, a conductive paste is applied onto some of the ceramic green sheets, so as to form conductive paste layers for constituting the first and second inner electrodes 11 and 12. Application of the conductive paste can be performed using, for example, various printing methods such as a screen printing method.

Subsequently, a plurality of ceramic green sheets on which a conductive paste layer is not printed are stacked one on top of another so that the total thickness becomes about 20 μm to about 30 μm, for example. On the multilayer body obtained, ceramic green sheets each having a thickness of about 0.7 μm to about 1.2 μm and having thereon a conductive paste layer of a shape corresponding to the shape of the first inner electrode 11, and ceramic green sheets each having a thickness of about 0.7 μm to about 1.2 μm and having thereon a conductive paste layer of a shape corresponding to the shape of the second inner electrode 12, are alternately stacked one on top of another. The total number of these alternately stacked ceramic green sheets is about 230 to 240. After that, a plurality of ceramic green sheets on which a conductive paste layer is not printed are further stacked one on top of another so that the total thickness becomes about 20 μm to about 30 μm, for example. Subsequently, the multilayer body obtained is pressed in the thickness direction to make a mother multilayer body.

In the press step, pressing is performed so that the end portions in the width direction W of the second principal surface 10b of the first and second ground terminal electrodes 17 and 18 are located closer to the first principal surface 10a than the portions, of the first and second ground terminal electrodes 17 and 18, located on the other portion R in the width direction of the second principal surface 10b is.

Subsequently, the mother multilayer body is cut along virtual cut lines to make a plurality of raw ceramic multilayer bodies. The cutting of the mother multilayer body can be performed by dicing or press cutting.

After the raw ceramic multilayer bodies have been made, chamfering or R-chamfering of edge portions, or polishing of a surface layer may be performed on each raw ceramic multilayer body, using barrel polishing or the like.

Subsequently, the raw ceramic multilayer body is fired. A firing temperature can be appropriately set in accordance with the ceramic material to be used or the type of conductive paste.

Subsequently, a conductive paste containing a glass powder and a conductive material is applied onto the ceramic multilayer body, so as to form a first conductive paste layer and a second conductive paste layer. The first conductive paste layer is used to constitute the third and fourth electrode layers 23 and 24 of the first and second signal terminal electrodes 15 and 16. The second conductive paste layer is used to constitute the first and second electrode layers 21 and 22 of the first and second ground terminal electrodes 17 and 18.

Subsequently, a firing step is performed on the first and second conductive paste layers. After that, a Ni plating layer and a Sn plating layer are formed in this order on the second electrode layer 22, and a Ni plating layer and a Sn plating layer are formed in this order on the fourth electrode layer 24. Accordingly, the first and second signal terminal electrodes 15 and 16 and the first and second ground terminal electrodes 17 and 18 are formed.

With the above-described steps, the ceramic capacitor 1 is completed.

In this preferred embodiment, a description has been given of an example in which a first signal terminal electrode constitutes a first terminal electrode, a second signal terminal electrode constitutes a second terminal electrode, a first ground terminal electrode constitutes a third terminal electrode, and a second ground terminal electrode constitutes a fourth terminal electrode. However, the present invention is not limited to this configuration. For example, the first and second ground terminal electrodes may constitute the first and second terminal electrodes, and the first and second signal terminal electrodes may constitute the third and fourth terminal electrodes.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a main body including a first principal surface and a second principal surface each extending along a first direction and a second direction which is perpendicular or substantially perpendicular to the first direction, a first side surface and a second side surface each extending along the first direction and a third direction which is perpendicular or substantially perpendicular to the first and second directions, and a third side surface and a fourth side surface each extending along the second direction and the third direction;
a first terminal electrode that is disposed on the first side surface and extends to the second principal surface;
a second terminal electrode that is disposed on the second side surface and extends to the second principal surface;
a third terminal electrode that is disposed on the third side surface and extends to the second principal surface; and
a fourth terminal electrode that is disposed on the fourth side surface and extends to the second principal surface; wherein
the third terminal electrode and the fourth terminal electrode include a conductive paste layer which is directly connected to an inner electrode; and
maximum values of thicknesses of portions located on the second principal surface of the third and fourth terminal electrodes are smaller than maximum values of thicknesses of portions located on the second principal surface of the first and second terminal electrodes.

2. The electronic component according to claim 1, wherein lengths along the second direction of the third and fourth side surfaces are larger than lengths along the first direction of the first and second side surfaces.

3. The electronic component according to claim 1, wherein the first and second terminal electrodes extend, on the second principal surface, from one end portion to another end portion in the first direction of the second principal surface.

4. The electronic component according to claim 1, wherein lengths along the second direction of the first and second terminal electrodes on the second principal surface are larger than lengths along the first direction of the third and fourth terminal electrodes on the second principal surface.

5. The electronic component according to claim 1, wherein
end portions in the first direction of the second principal surface are located closer to the first principal surface than another portion in the first direction of the second principal surface; and
at least some of portions located on the second principal surface of the third and fourth terminal electrodes are located on the end portions in the first direction of the second principal surface.

6. The electronic component according to claim 5, wherein the third and fourth terminal electrodes each extend to the another portion in the first direction of the second principal surface.

7. The electronic component according to claim 1, wherein the electronic component is one of a ceramic capacitor, a piezoelectric component, a thermistor, and an inductor.

8. The electronic component according to claim 1, wherein the main body is made of a dielectric material.

9. The electronic component according to claim 1, wherein the main body includes at least one of $BaTiO_3$, $CaTiO_3$, $SrTiO_3$, and $CaZrO_3$.

10. The electronic component according to claim 1, wherein the main body includes at least one of a Mn compound, a Mg compound, a Si compound, a Fe compound, a Cr compound, a Co compound, a Ni compound, and a rare earth compound.

11. The electronic component according to claim 1, wherein the main body includes first and second internal electrodes.

12. The electronic component according to claim 11, wherein each of the first and second internal electrodes includes at least one of Ni, Cu, Ag, Pd, Au, and a Ag—Pd alloy.

13. The electronic component according to claim 1, wherein the third terminal electrode defines a first ground terminal electrode disposed on the third side surface and the fourth terminal electrode defines a second ground terminal electrode disposed on the fourth side surface.

14. The electronic component according to claim 13, wherein the first ground terminal electrode extends onto the first and second principal surfaces, and the second ground terminal electrode extends onto the first and second principal surfaces.

15. The electronic component according to claim 13, wherein each of the first and second ground terminal electrodes includes a first electrode layer disposed on the third side surface or the fourth side surface and a second electrode layer disposed on the first electrode layer.

16. The electronic component according to claim 15, wherein each of the first electrode layer and the second electrode layer include glass and a conductive material.

17. The electronic component according to claim 1, wherein the maximum values of thicknesses of portions located on the second principal surface of the third and fourth terminal electrodes are equal to or less than about 0.95 times the maximum values of thicknesses of portions located on the second principal surface of the first and second terminal electrodes.

18. The electronic component according to claim 1, wherein the maximum values of thicknesses of portions located on the second principal surface of the third and fourth terminal electrodes are equal to or more than about 0.65 times the maximum values of thicknesses of portions located on the second principal surface of the first and second terminal electrodes.

19. The electronic component according to claim 1, wherein lengths along a length direction of the first and second terminal electrodes on the second principal surface are larger than lengths along a width direction of the third and fourth ground terminal electrodes on the second principal surface.

20. The electronic component according to claim 1, wherein
at least some of portions located on the second principal surface of the third and fourth terminal electrodes are located on the end portions of the main body in a width direction of the second principal surface.

* * * * *